(12) United States Patent
Powell, Jr.

(10) Patent No.: US 8,359,702 B2
(45) Date of Patent: *Jan. 29, 2013

(54) BALL AND SOCKET JOINT UTILIZING A SINGLE BALL, FOR DRIVING MORE THAN ONE DRIVEN MEMBER

(75) Inventor: Edward S. Powell, Jr., Albany, OR (US)

(73) Assignee: Albany Magneto Equipment, Inc, Jefferson, OR (US)

( * ) Notice: Subject to any disclaimer, the term of this patent is extended or adjusted under 35 U.S.C. 154(b) by 95 days.

This patent is subject to a terminal disclaimer.

(21) Appl. No.: 12/953,355

(22) Filed: Nov. 23, 2010

(65) Prior Publication Data

US 2011/0067198 A1 Mar. 24, 2011

Related U.S. Application Data

(62) Division of application No. 11/386,270, filed on Mar. 21, 2006, now Pat. No. 7,861,364.

(60) Provisional application No. 60/663,387, filed on Mar. 21, 2005.

(51) Int. Cl.
*B60S 1/24* (2006.01)

(52) U.S. Cl. .................. 15/250.27; 15/250.3; 15/250.31; 74/25; 403/122

(58) Field of Classification Search ............... 15/250.14, 15/250.27, 250.3, 250.31; 74/25, 51; 403/122, 403/161, 162
See application file for complete search history.

(56) References Cited

U.S. PATENT DOCUMENTS

| | | | |
|---|---|---|---|
| 1,913,308 A | 6/1933 | Heuber et al. | |
| 2,533,963 A | 12/1950 | Sacchini | |
| 3,035,296 A | 5/1962 | Deibel | |
| 3,216,753 A | 11/1965 | Oishei | |
| 3,247,540 A | 4/1966 | Howard et al. | |
| 3,404,423 A | 10/1968 | Howard et al. | |
| 3,644,956 A | 2/1972 | Parker | |
| 3,688,334 A | 9/1972 | Peterson | |
| 3,689,955 A | 9/1972 | Winkelmann | |
| 3,729,766 A | 5/1973 | Buchanan | |
| 3,749,431 A | 7/1973 | Schmid et al. | |
| 3,768,112 A | 10/1973 | Kolb | |
| 3,831,219 A | 8/1974 | Deutscher | |
| 4,009,502 A | 3/1977 | Tamaki | |
| 4,546,518 A | 10/1985 | Harbison et al. | |
| 5,351,423 A | 10/1994 | Vohl | |
| 5,473,955 A | 12/1995 | Stinson | |
| 5,507,585 A | 4/1996 | Diederich et al. | |
| 5,542,145 A | 8/1996 | Buchanan | |
| 5,549,286 A | 8/1996 | Vacca | |
| 5,675,862 A | 10/1997 | Reinl | |
| 6,059,294 A | 5/2000 | Gorce | |
| 6,196,752 B1 | 3/2001 | Komiyama | |
| 6,196,754 B1 | 3/2001 | Bruemmer et al. | |
| 6,406,089 B1 | 6/2002 | Zimmer | |

(Continued)

FOREIGN PATENT DOCUMENTS

DE 3241551 A1 5/1984
DE 4400296 A1 7/1995

(Continued)

*Primary Examiner* — Mark Spisich

(74) *Attorney, Agent, or Firm* — Chernoff, Vilhauer, McClung & Stenzel, LLP

(57) ABSTRACT

An articulating ball joint for connecting a pair of driven members to a driving member such as a crank pin. In one embodiment, a single ball is held in a first, or inner, socket defined by a coupling member having a convex outer surface, and the first socket is held within a second, outer, socket defined in a second coupling member also having a convex outer surface, which is, in turn, engaged by a retainer.

17 Claims, 15 Drawing Sheets

U.S. PATENT DOCUMENTS

| | | |
|---|---|---|
| 6,510,580 B1 | 1/2003 | Saitou |
| 6,637,798 B2 | 10/2003 | Hoshikawa |
| 6,718,593 B2 | 4/2004 | Shido |
| 6,901,623 B2 | 6/2005 | Ohashi |
| 2004/0221413 A1 | 11/2004 | Hultquist |
| 2004/0226128 A1 | 11/2004 | Sugiyama |
| 2004/0253049 A1 | 12/2004 | Bissonnette et al. |

FOREIGN PATENT DOCUMENTS

| | | |
|---|---|---|
| FR | 2534537 A1 | 4/1984 |
| FR | 2789132 A1 | 8/2000 |
| WO | WO 94/19220 | 9/1994 |

BALL AND SOCKET JOINT UTILIZING A SINGLE BALL, FOR DRIVING MORE THAN ONE DRIVEN MEMBER

CROSS-REFERENCE TO RELATED APPLICATIONS

This application is a division of U.S. patent application Ser. No. 11/386,270, filed Mar. 21, 2006, now U.S. Pat. No. 7,861,364, which claims the benefit of U.S. Provisional Patent Application Ser. No. 60/663,387, filed Mar. 21, 2005, of which the disclosure is hereby incorporated herein by reference.

BACKGROUND OF THE INVENTION

The present invention relates to mechanisms for driving wiper systems, and in particular relates to ball joints for use in mechanisms for driving a pair of wipers using a single motor.

Windshield wipers for passenger automobiles are usually provided in pairs driven in tandem by a linkage and powered by a single motor. A rotary drive crank or eccentric driven by the motor is connected through connecting rods to levers that move wiper arm pivot shafts reciprocatingly through limited arcs. Ball joints are used to attach the connecting rods to the drive crank and the lever connected with each wiper arm shaft, and the drive crank is rotated continuously to provide continuous reciprocating pivoting movement in the wiper arms. With a single eccentric or drive crank used to control a pair of wiper arms, each connecting rod is typically connected to the eccentric crank pin through a separate ball joint.

The wiper arm pivot shafts may not be parallel with one another nor with the drive crank shaft, and so connection through the use of ball joints is necessary. Both ball joints must be on the same side of the crank arm in order for the crank to avoid interference with the motor. Conventionally, two ball joints are mounted on a single crank pin carried by the eccentric drive crank arm. Such a conventional arrangement of a pair of ball joints is shown, for example, in Schmid, et al., U.S. Pat. No. 3,749,341 and Stinson, U.S. Pat. No. 5,473,355.

Mounting a pair of ball joints alongside one another on a crank pin creates a significant lever arm length between the further one of such ball joints and the eccentric drive crank arm in which the crank pin is mounted. This long coupling may result in less precise drive of the wipers than is desired. In operating large wipers, for wiping large windshields such as those on large trucks, motor homes, industrial and agricultural equipment, buses, or ships, the forces carried through the connecting rods, when applied through the lever arm provided by such a crank pin and a pair of ball joints, may result in excessive amounts of stress applied to the eccentric drive crank arm.

French Patent No. FR2789132, assigned to Peugeot Citroen Automobiles SA, discloses a ball joint connection including a single ball to drive two connecting rods. A first connecting rod is mated to the ball by a first socket having a convex exterior surface over which a second socket is mated, to attach a second connecting rod to the single ball. However, since the sockets are of resilient plastic material and apparently merely snap resiliently into a mating relationship, the assembly thus provided may be subject to separation or failure under load, and thus may not be capable of carrying larger loads which may be imposed through use of such of a connection in a wiper system including large wipers.

What is desired, then, is an improved close-coupled ball joint through which a single ball can drive a pair of connecting members, which is able to carry large loads without failure, and which, nevertheless, can be manufactured at a reasonable cost.

SUMMARY OF THE INVENTION

The present invention provides a single-ball drive connection system as defined by the claims appended hereto and which is intended to overcome one or more of the aforementioned shortcomings and disadvantages of prior art ball-and-socket connections.

In one embodiment a pair of sockets are nested about one another and a single ball carried on a crank pin, with an inner socket having an outer surface that is received inside an outer socket, and a retainer associated with the crank pin keeps the two sockets from separating from each other and the ball.

In one embodiment the second, outer, socket has a convex outer surface and the retainer has a mating concave surface.

In one embodiment a first, inner, socket is mated with the ball and also has a convex outer surface that acts as a ball to which the outer, second, socket is mated.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
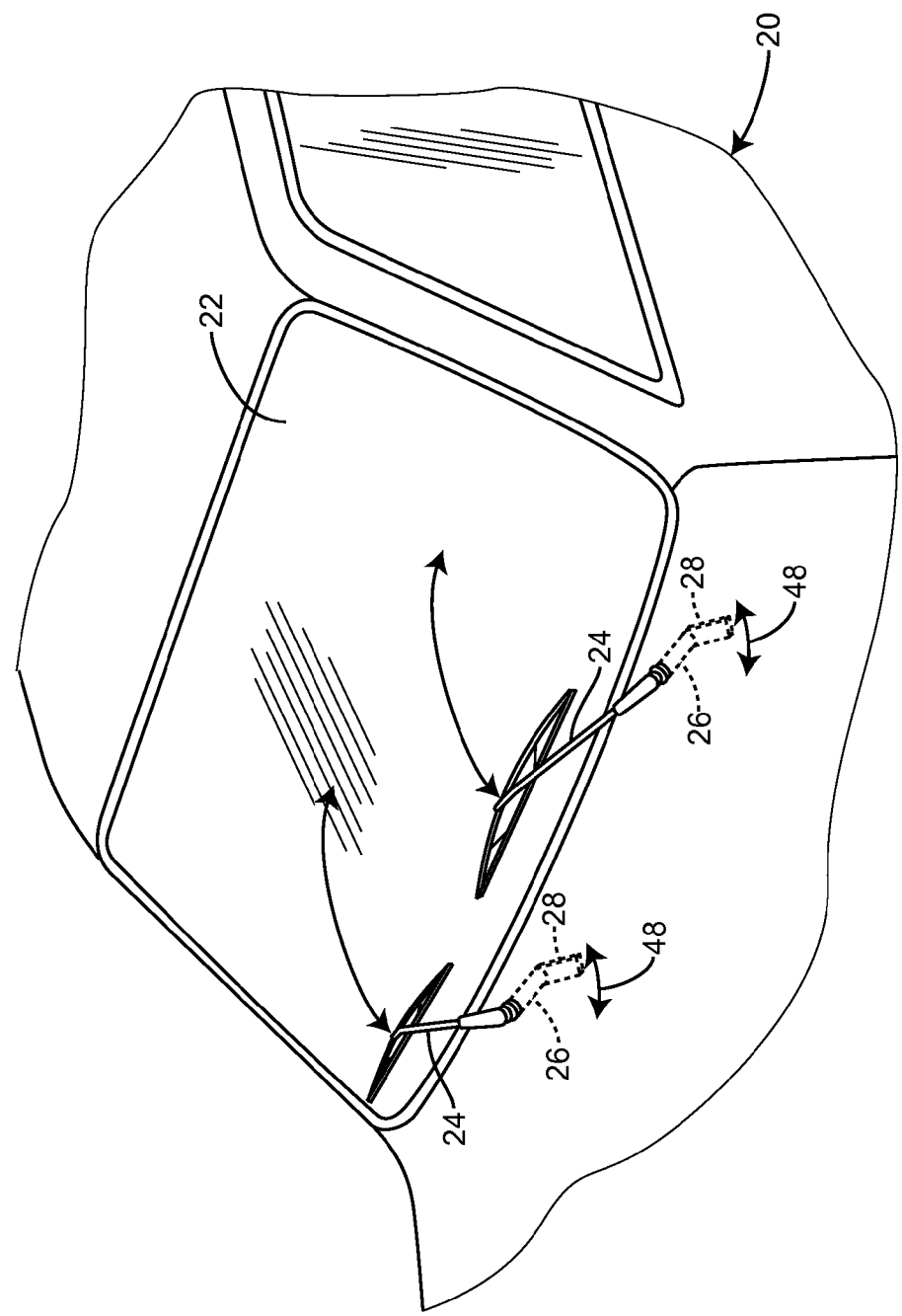
FIG. 1 is a fragmentary isometric view of a motor vehicle showing a pair of windshield wipers and parts of a wiper drive mechanism according to the present invention.

Referring now to the drawings which form a part of the disclosure herein, in FIG. 1 an automobile 20 of which a portion is shown has a windshield 22 and wipers including wiper arms 24 mounted on pivot shafts 26 driven by drive levers 28 shown in phantom view.

Figure 2:
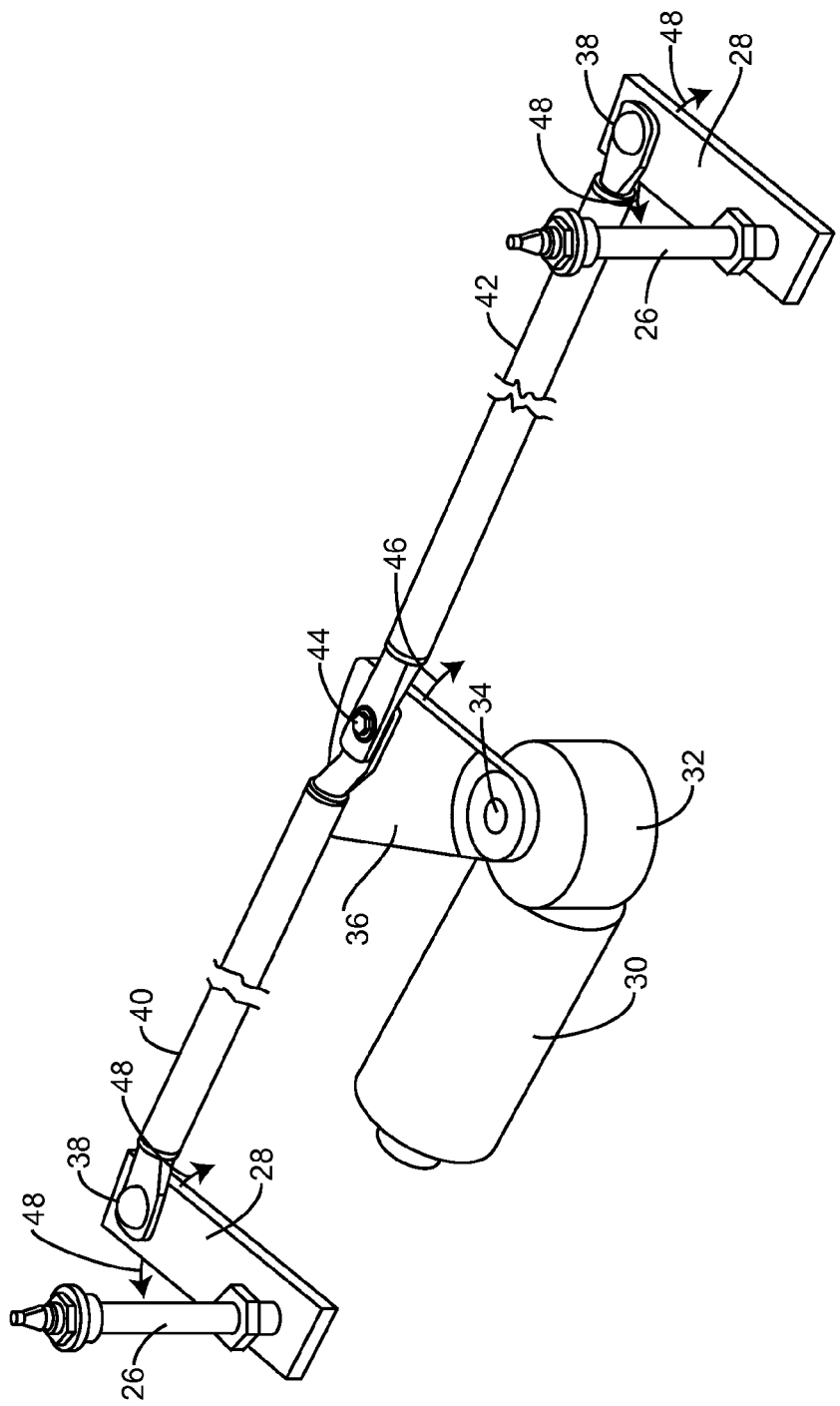
FIG. 2 is a simplified isometric view of a wiper drive system in accordance with an embodiment of the present invention for driving the windshield wipers shown in FIG. 1.

As shown in FIG. 2, the lever arms 28 for both wiper arms 24 are driven by a single drive motor 30 connected through a reduction gear 32, which may be a worm drive, whose output shaft, or wiper drive shaft 34, is drivingly connected to a crank arm 36.

On each of the lever arms 28, spaced apart by a suitable radius from the one of the pivot shafts 26 to which the particular lever arm 28 is attached, is a respective ball joint 38. A connecting rod 40 is attached to one of the lever arms 28 by one ball joint 38, and a connecting rod 42 is connected to the other of the lever arms 28 by the other ball joint 38. Both of the connecting rods 40 and 42 are connected to the crank arm 36 by a single ball joint 44 which will be explained in greater detail presently.

The crank arm 36 is driven by the drive shaft 34 in continuous rotation through complete revolutions, as indicated by the arrow 46. Continuous rotation of the crank arm 36 results in reciprocating pivoting motion of the lever arms 28 and the pivot shafts 26, as indicated by the arrows 48.

As may be seen in FIGS. 4, 5, 6, and 7, the crank arm 36 includes, at its inner end, a hole 50 to accept an end of the drive shaft 34, to which the crank arm 36 can be attached by conventional means such as a keyed mounting, a press fit, or a threaded nut to fasten the crank arm 36 securely to the drive shaft 34 for rotation therewith.

Spaced apart from the hole 50 by a suitable radius designed to provide the desired distance of reciprocating movement of the outer ends of the connecting rods 40 and 42, is a ball joint assembly 44, fastened securely to the crank arm 36 and acting as a crank pin as the crank arm 36 rotates during operation of the wiper drive system. The ball joint assembly 44 includes as its foundation a shaft 54 that is securely fastened to the crank arm.

Figure 4:
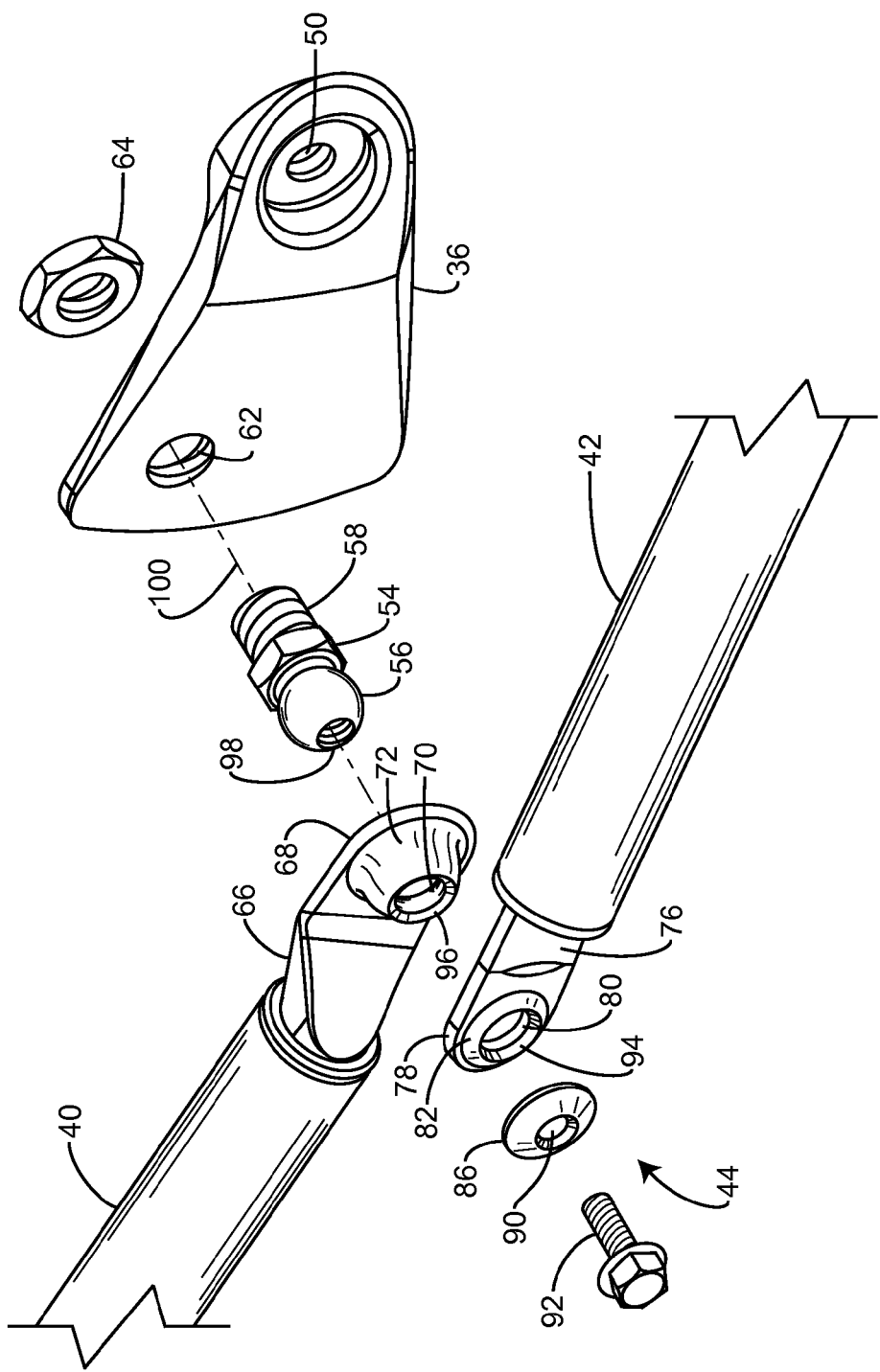
FIG. 4 is an exploded isometric view of a drive crank such as that included in the windshield wiper drive system shown in FIGS. 2 and 3, together with a ball joint embodying one aspect of the present invention and portions of a pair of oppositely extending connecting rods included in the wiper drive assembly.
Figure 5:
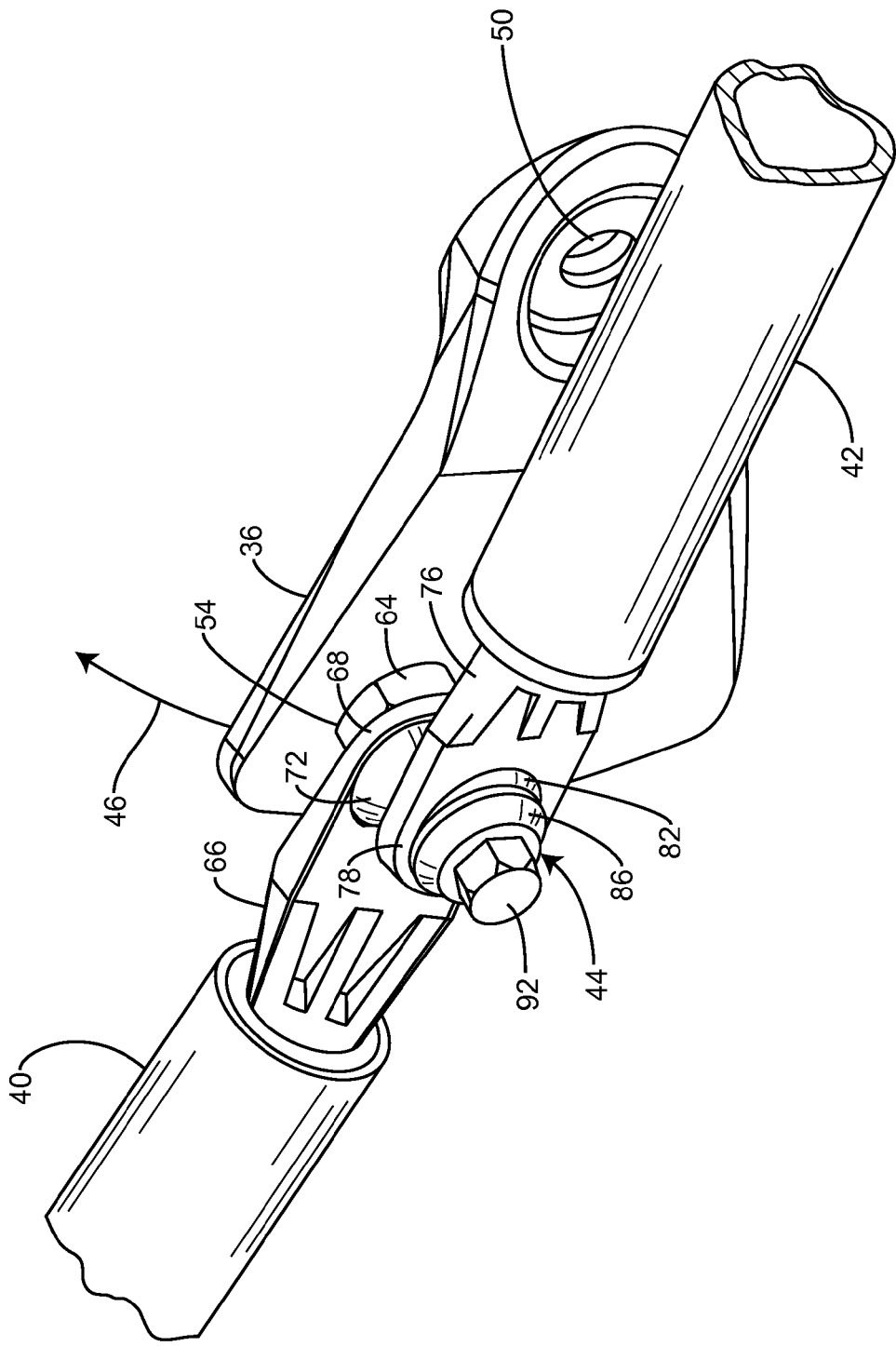
FIG. 5 is an isometric view of the assembled crank, ball joint, and connecting rods shown in FIGS. 2-4.

The ball joint 44 is shown in exploded view in FIG. 4, where it may be seen that there is a generally spherical ball 56 on the shaft 54. As shown in FIG. 4 the ball 56 is integral with the shaft 54. A base portion 58 of the shaft 54 extends through a hole 62 in the crank arm 36, and is held securely in place in the crank arm 36 by a nut 64 threaded onto the base 58. The shaft 54 includes a hexagonal portion 60 having opposed flats to help hold the shaft 54 as the nut 64 is tightened to hold the shaft attached to the crank arm 36. Alternatively, other manners of attachment of the shaft 54 to the crank arm 36 could be employed. For example, the hole 62 might be threaded, or the base portion 58 might be press fitted or staked into the crank arm 36 or might be riveted into secure attachment in the hole 62.

The inboard end of the connecting rod 40 includes an end piece 66 including a coupling 68 that defines a concave, or cup-like, socket 70 that fits matingly on the ball 56. The connecting rod 40 extends away from the crank arm 36 in a first direction, as shown in more detail and in section view in FIG. 9. This allows the connecting rod 40 to move through at least a limited angle about any axis with respect to the crank arm 36, while also allowing the shaft 54 to rotate continuously with respect to the coupling 68 as the crank arm 36 rotates with the drive shaft 34. An outer surface 72 of the coupling 68 is convex and preferably concentric with the interior surface of the socket 70 and thus also concentric with the outer surface of the ball 56. The end piece 66 provides a location for the socket 70 and the outer surface 72 of the coupling 68, offset in a direction toward the crank arm 36, so that there is ample clearance between the main body portion of the connecting rod 40 and the crank arm 36 when the socket 70 is engaged with the ball 56.

An inboard end piece 76 of the connecting rod 42 includes a coupling 78 defining a concave, or cup-like socket 80 whose interior surface is concave and shaped to fit matingly onto the outer surface 72 of the coupling 68. The socket 80 and the outer surface 72 act as a ball-and-socket joint similar to the interrelationship between the socket 70 and the ball 56, with the connecting rod 42 extending away from the ball joint 44 in a second direction generally opposite the direction of the connecting rod 40.

The coupling 78 also has a convex outer surface 82 which may be spherical and also concentric with the interior surface of the socket 80. A retainer 86 has an arcuately concave inner surface 88 preferably shaped to fit matingly against the convex outer surface 82 of the coupling 78, as a truncated ball-and-socket joint. The retainer 86 may have a form generally similar to that of a dished washer, and has a central opening 90 of an appropriate size to receive the threaded body of a fastener 92 such as a machine bolt, that passes through the central opening 90 of the retainer 86, through an opening 94 centrally located in the coupling 78, and through an opening 96 located centrally in the coupling 68, and is mated in threads 98 within the ball 56. The fastener 92 thus holds the retainer 86 in place to keep the couplings 78 and 68 engaged with each other and to keep the coupling 68 mated with the ball 56.

Figure 9:
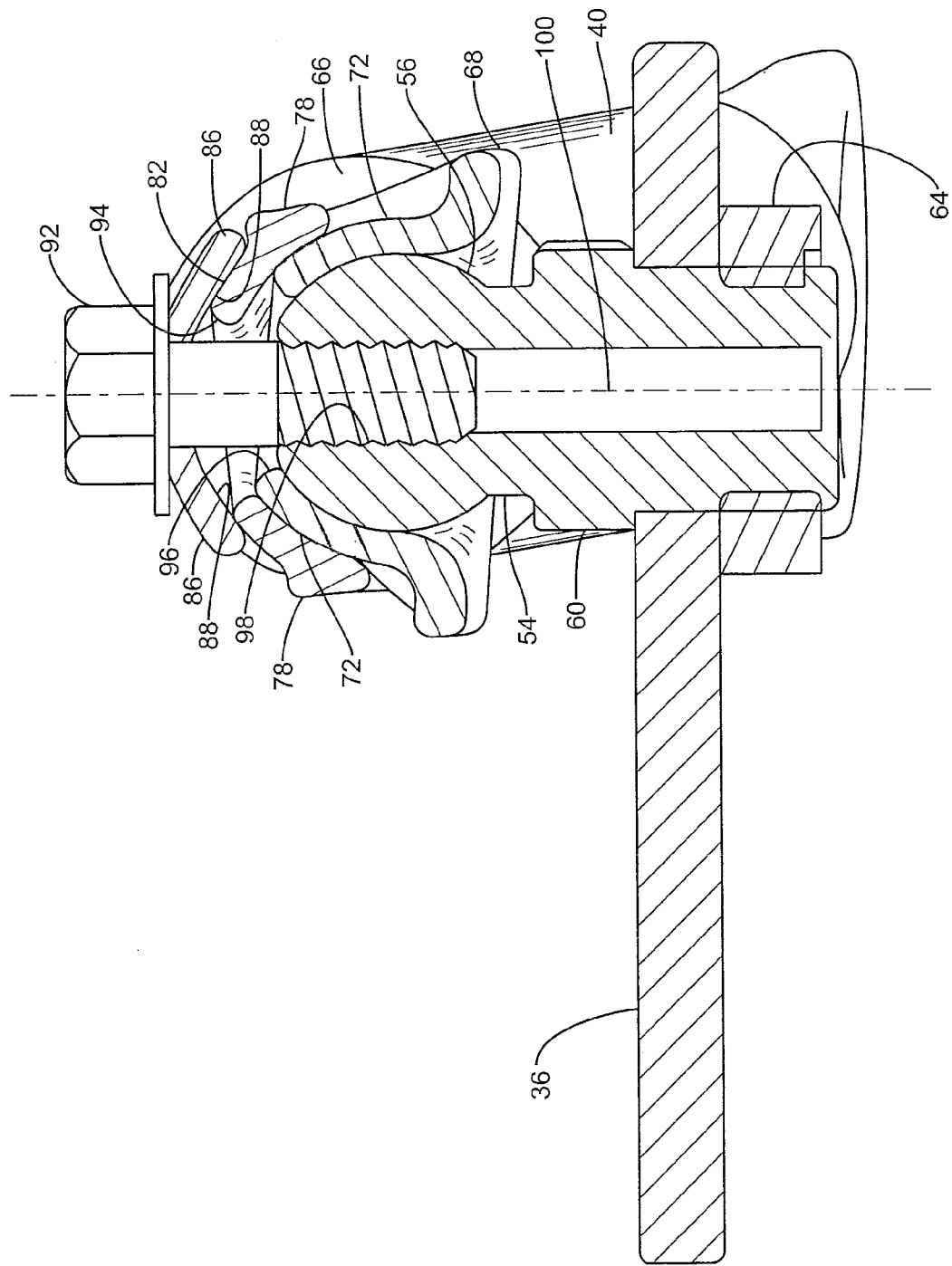
FIG. 9 is a section view taken along line 9-9 of FIG. 6.

The openings 94 and 96 are both larger in diameter than the diameter of the threaded shank of the fastener 92, as may be seen most clearly in FIG. 9. The coupling 68 is thus afforded freedom of angular movement with respect to the ball 56 through an angle related to the difference in size between the diameter of the opening 96 and the diameter of the body of the fastener 92. The ball 56 is also free to rotate in the socket 70, about the longitudinal central axis 100 of the shaft 54, as the crank arm 36 rotates when driven by the drive shaft 34. Similarly, the coupling 78 is free to move in any direction with respect to the outer surface 72 of the coupling 68 through an angle determined principally by the relative sizes of the opening 94 and the shaft of the fastener 92 and by the position of the coupling 68 relative to the ball 56. The coupling 78 is also free to rotate reciprocatingly with respect to the outer surface 72 through an angle about the central axis 100, during rotation of the crank arm 36.

Since the coupling 78 is nested matingly around the coupling 68 the effective lever arm length of the shaft 54 through which the connecting rod 42 acts on the crank arm 36 is only slightly greater than the lever arm length of the shaft 54 through which the connecting rod 40 acts on the crank arm 36 by its contact directly on the ball 56. The ball joint 44 described herein thus provides a closer coupling between the connecting rods 40 and 42 and the crank arm 36 than is possible utilizing the prior art arrangement of two separate ball joints carried atop one another on a crank pin on one side of a crank arm.

Figure 3:
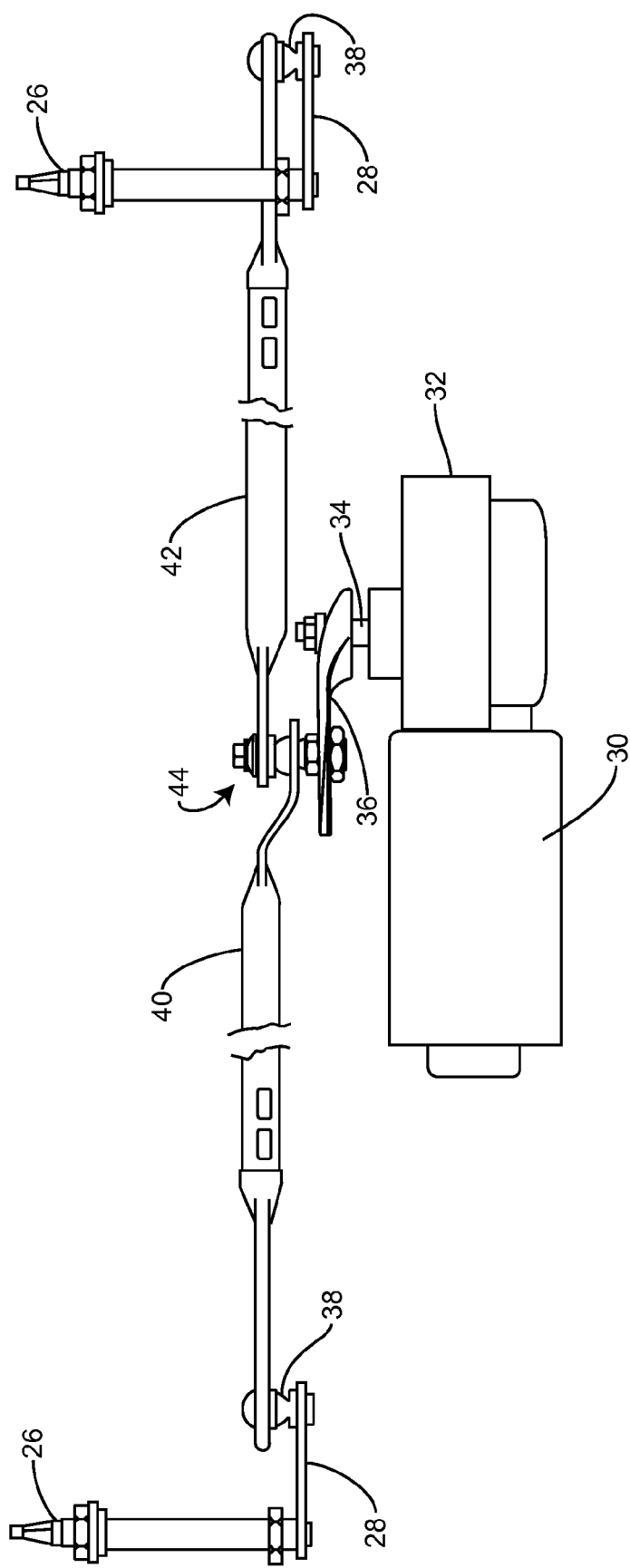
FIG. 3 is an elevational view of the windshield wiper drive assembly shown in FIG. 2.
Figure 6:
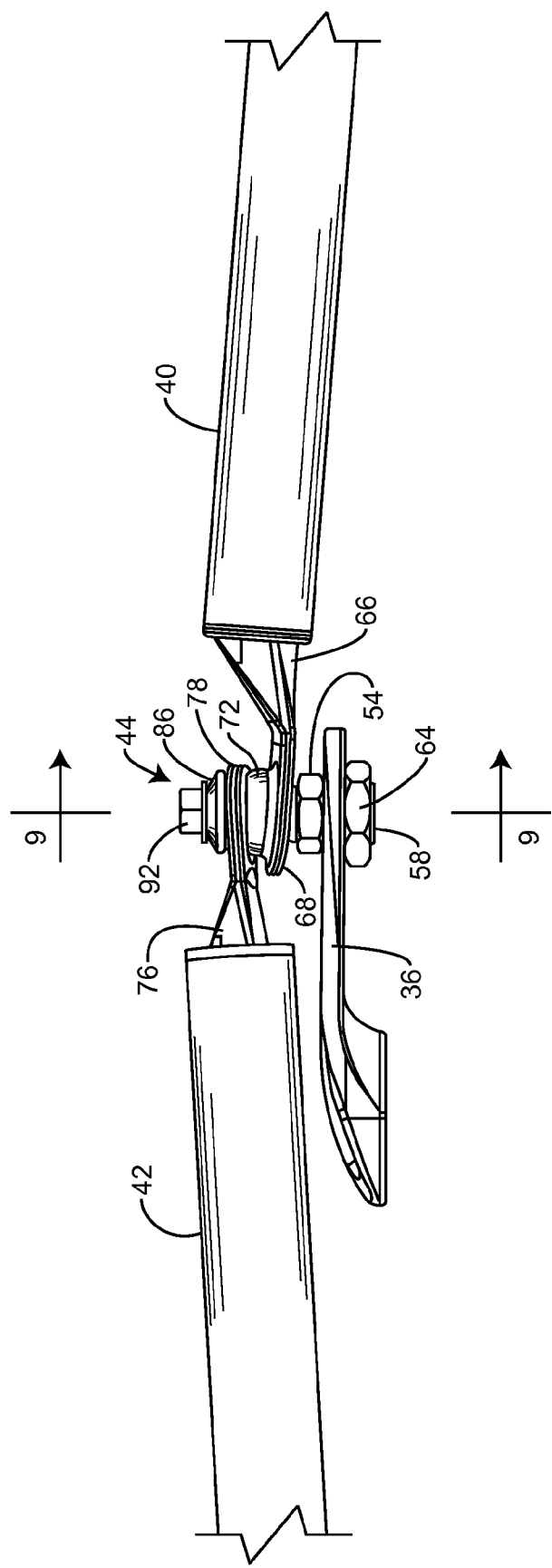
FIG. 6 is a top plan view of the crank, ball joint, and connecting rods shown in FIGS. 4 and 5.
Figure 7:
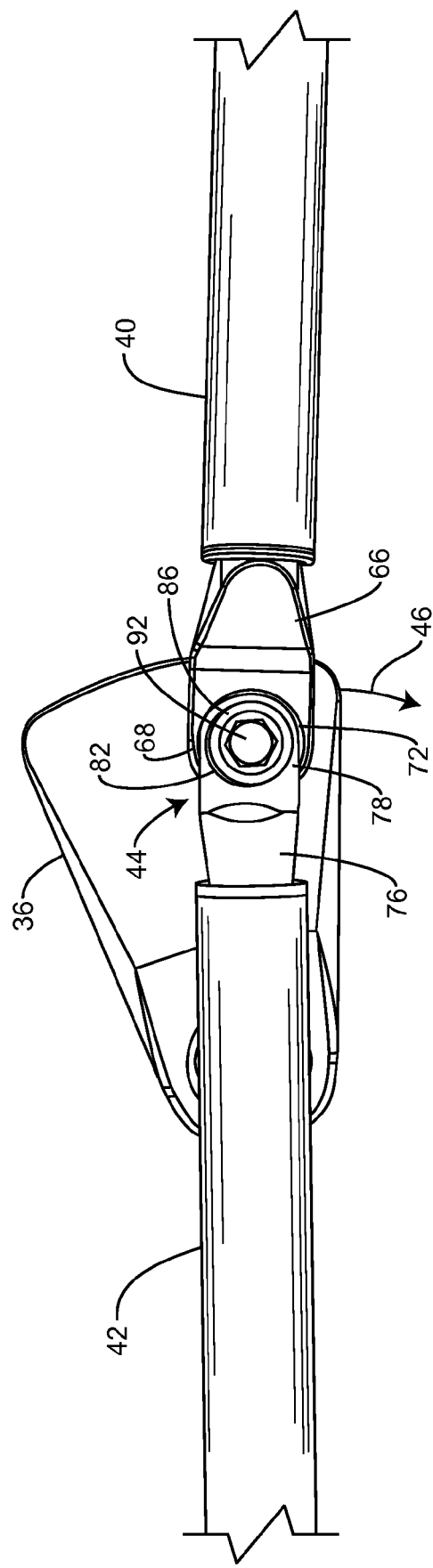
FIG. 7 is a front elevational view of the crank, ball joint, and connecting rods shown in FIGS. 4, 5, and 6.
Figure 8:
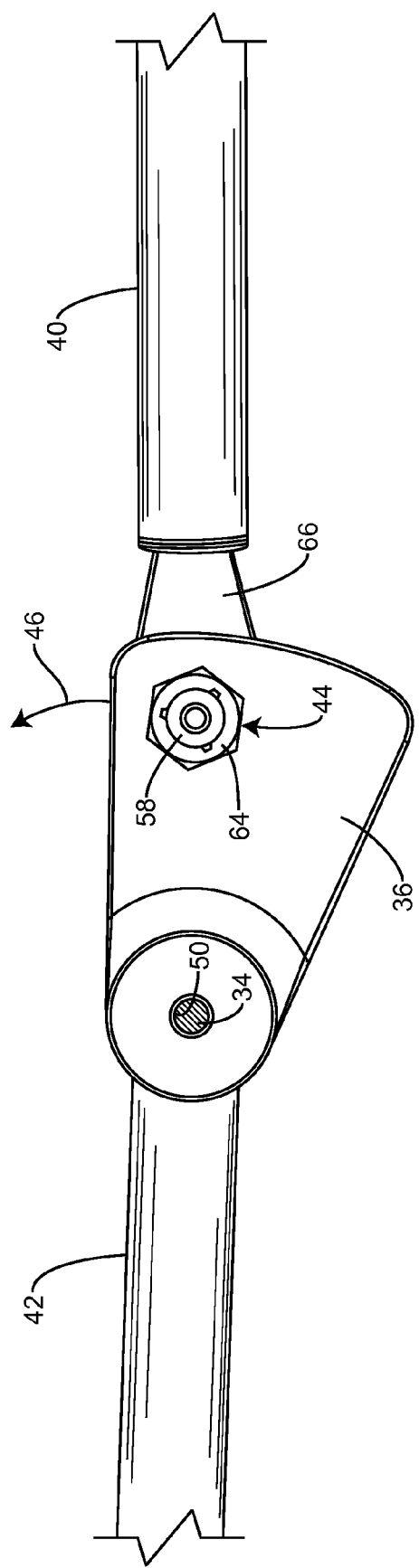
FIG. 8 is a rear elevational view of the crank and connecting rods shown in FIGS. 4, 5, 6, and 7.

As shown best in FIG. 6, the freedom of movement of the connecting rods 40 and 42 as a result of the freedom of angular movement of the couplings 68 and 78 with respect to the ball 56 and shaft 54 permits the wiper drive assembly shown in FIGS. 2 and 3 to be used where the wiper arm pivot shafts 26 are not aligned parallel with each other nor with the drive shaft 34.

The crank arm 36 and the ball joint 44 may be made of conventional materials, including cast, forged, or pressed metal, or suitably reinforced molded plastic, depending upon the size of a wiper system or other mechanism to be driven and the resulting forces expected to be encountered during service. In particular, the shaft 54 may be made of a suitable cast or machined metal or may be molded of reinforced plastics material. The end pieces 66 and 76, including the couplings 68 and 78, may be made using conventional manufacturing methods, of materials such as suitable cast or pressed metal or molded or machined reinforced plastics material, as determined by the loads expected to be encountered during use of the wiper system or other mechanism driven by the ball joint assembly 44. Thus the socket 70 of the coupling 68 may be attached to the ball 56 with a snap fit depending on resiliency of the coupling 68, and the socket 80 of the coupling 78 may be attached to the coupling 68 with such a snap fit if ample angular freedom is left available in such a design. The retainer 86 may be of similar materials.

Figure 10:
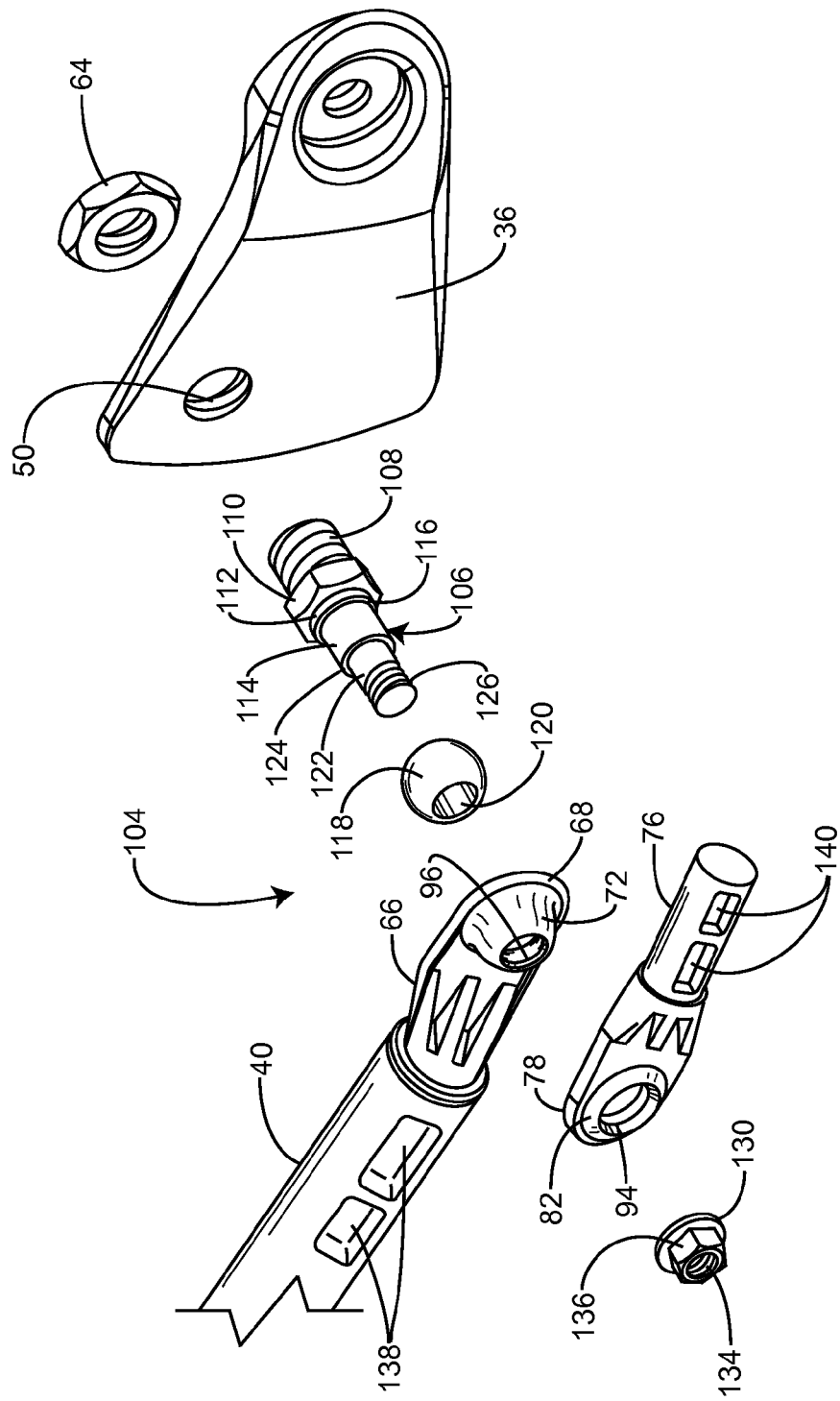
FIG. 10 is an exploded isometric view similar to FIG. 4, but showing an alternative form of the ball joint.
Figure 11:
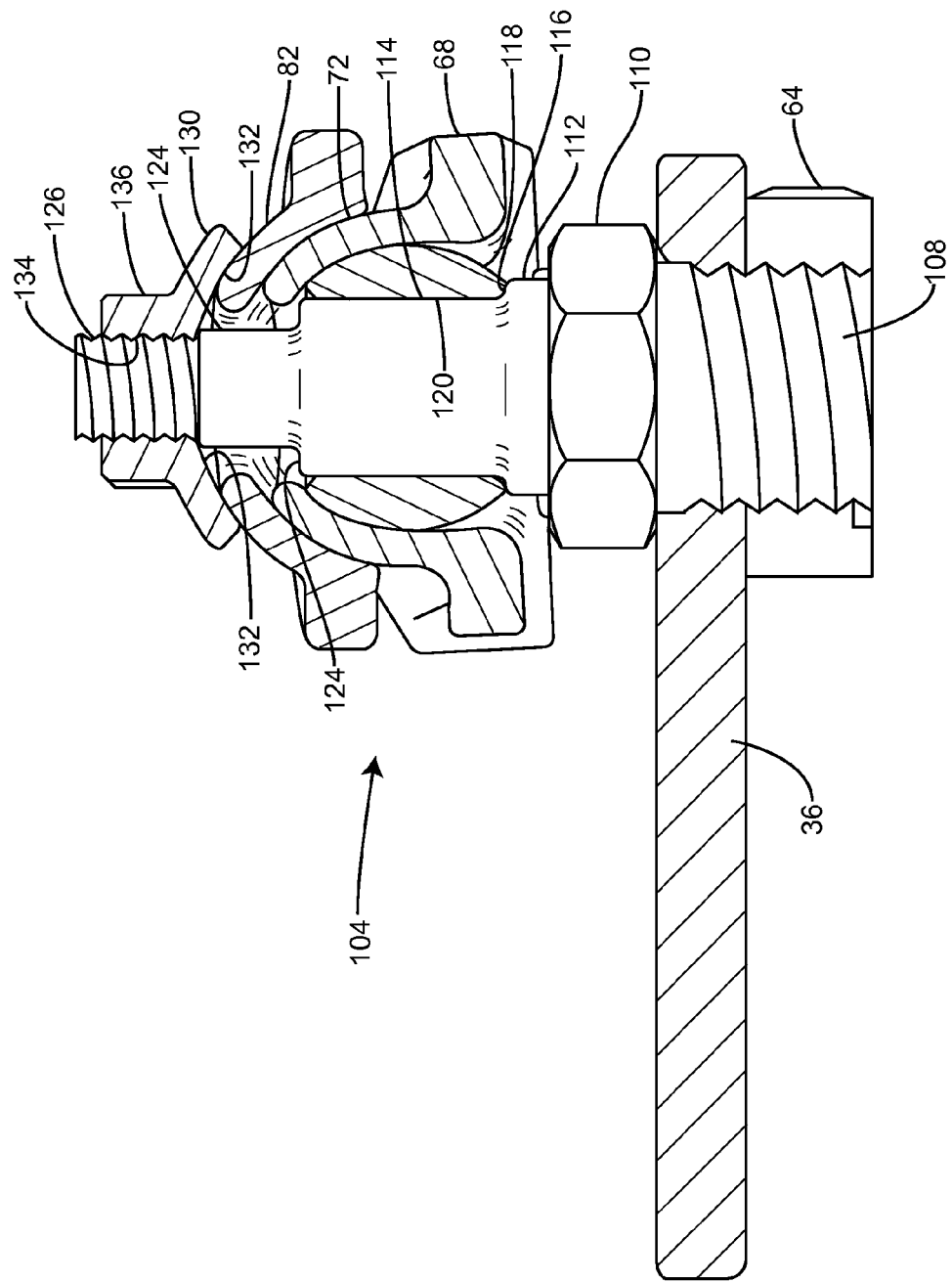
FIG. 11 is a section view of the ball joint shown in FIG. 10, taken in the direction indicated by line 9-9 in FIG. 6.

Referring next to FIGS. 10 and 11, a ball joint 104 is in many ways similar to the ball joint 44, but instead of the shaft 54 there is a shaft 106 including a base portion 108 similar to the base portion 58 of the shaft 54. The shaft 106 includes a hexagonal flat sided section 110, a short axial spacer section 112 adjacent the hexagonal flat sided portion 110, and a cylindrical main body portion 114 axially adjacent the spacer 112 and further from the base portion 108. The spacer 112 is larger in diameter than the cylindrical main body portion 114 and thus defines a narrow radial shoulder 116. A generally spherical bearing member or ball 118 includes a central bore 120 that fits snugly on the cylindrical main body portion 114, as shown best in FIG. 11. The shaft 106 has a smaller diameter portion 122 demarcated by a shoulder 124 at the outer end of the cylindrical main body portion 114, and a helical external thread 126 is defined in an outer end portion of the shaft 106, extending beyond the smaller diameter portion 122.

Instead of the separate retainer 86 included in the ball joint 44, there is a retainer 130 including a follower portion or body defining a concave internal surface 132 similar to the inner surface 88 of the retainer 86, and thus preferably shaped to fit matingly in contact with the outer surface 82 of the coupling portion 78 of the end member 76 of the connecting rod 42. The retainer 130 defines a threaded central bore 134 that fits matingly on the threaded portion 126 of the shaft 106. A hexagonal flat sided nut-like portion 136 is integral with the body of the retainer 130 and facilitates connecting the retainer 132 to the threaded portion 126 of the shaft 106. It will be appreciated that the nut-like portion 136 could have other configurations to be engaged by corresponding tools to turn the retainer 132 into engagement on the threads of the threaded portion 126, and that the retainer 130 could be attached to the shaft 106 in other ways including swaging, riveting, or pinning.

The configuration of the shaft 106, spherical bearing 118, and retainer 130 give a manufacturing option of using different materials for the shaft 106 and the spherical bearing 118, so that the materials best for the functions of those two parts might be used. For example, the shaft 106 could be of a strong metal, while the spherical bearing 118 may be of a material that is better suited for use as a bearing than the metal chosen for use as the shaft 106.

It may be seen that the end piece 66 is fastened to the connecting rod 40 by crimped indentations 138 in tubular metal material of the connecting rod, mated in receptacles 140, as shown in the end piece 76.

Figure 12:
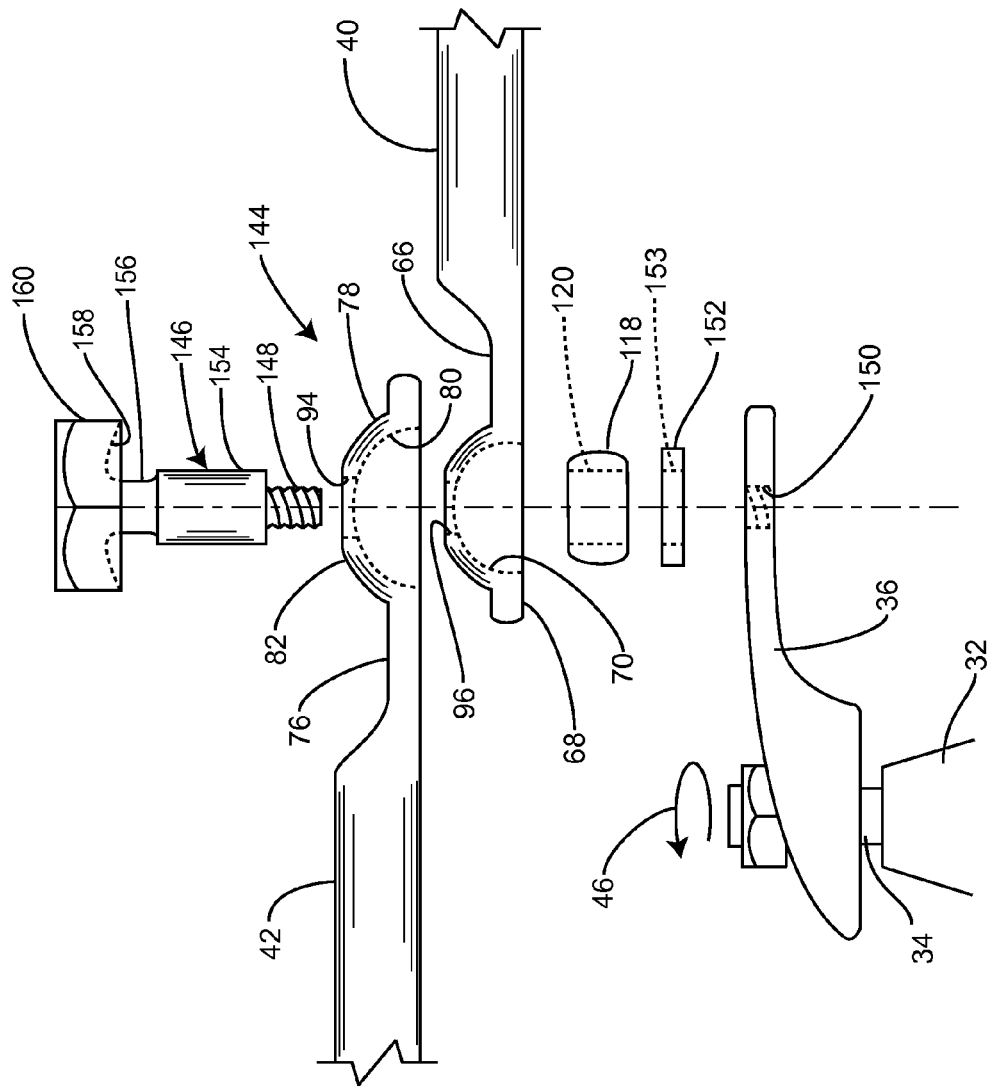
FIG. 12 is an exploded section view of another alternative form of the ball joint.

Referring to FIG. 12, a ball joint 144 also includes a spherical bearing 118, but has a shaft in the form of a shoulder bolt 146 having a threaded inner end portion 148 that fits matingly in a threaded bore 150 in a crank arm 36'. A spacer 152 includes a central bore 153 through which the cylindrical main body portion 154 of the shaft 146 fits, and the cylindrical main body portion 154 also fits through the central bore 120 in the spherical bearing 118.

Preferably, a smaller diameter portion 156 is provided on the shaft 146 outwardly beyond the main body portion 154 to provide a required amount of angular clearance for the openings 94 and 96 to allow angular movement of the couplings 68 and 78 with respect to the shaft 146. A concave bottom surface 158, shaped to fit matingly against the convex outer surface 82 of the coupling 78, is provided in a head 160 of the shoulder bolt 146. The head 160 may be configured as a flat-sided hexagonal head or may have another shape that can be engaged by a corresponding wrench to fasten the shoulder bolt 146 to the crank arm 36.

Figure 13:
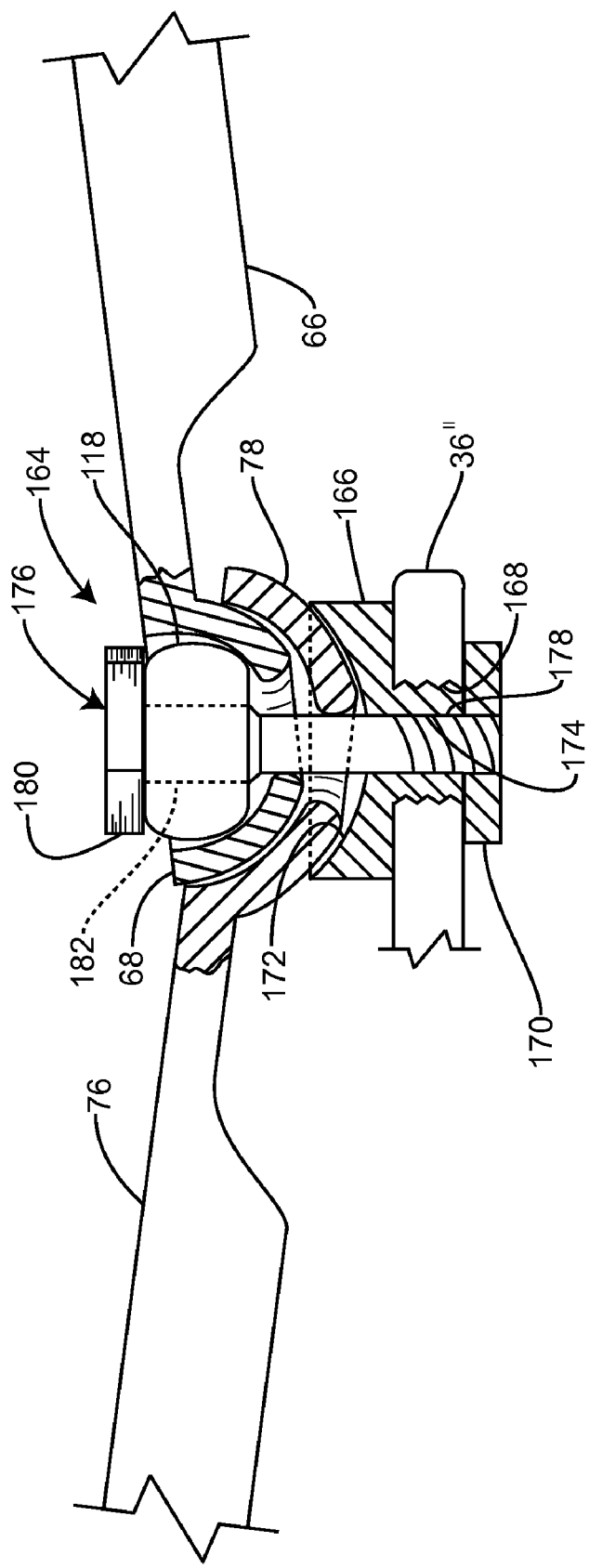
FIGS. 13-15 are simplified section views of ball joints which are yet other alternative embodiments.
Figure 14:
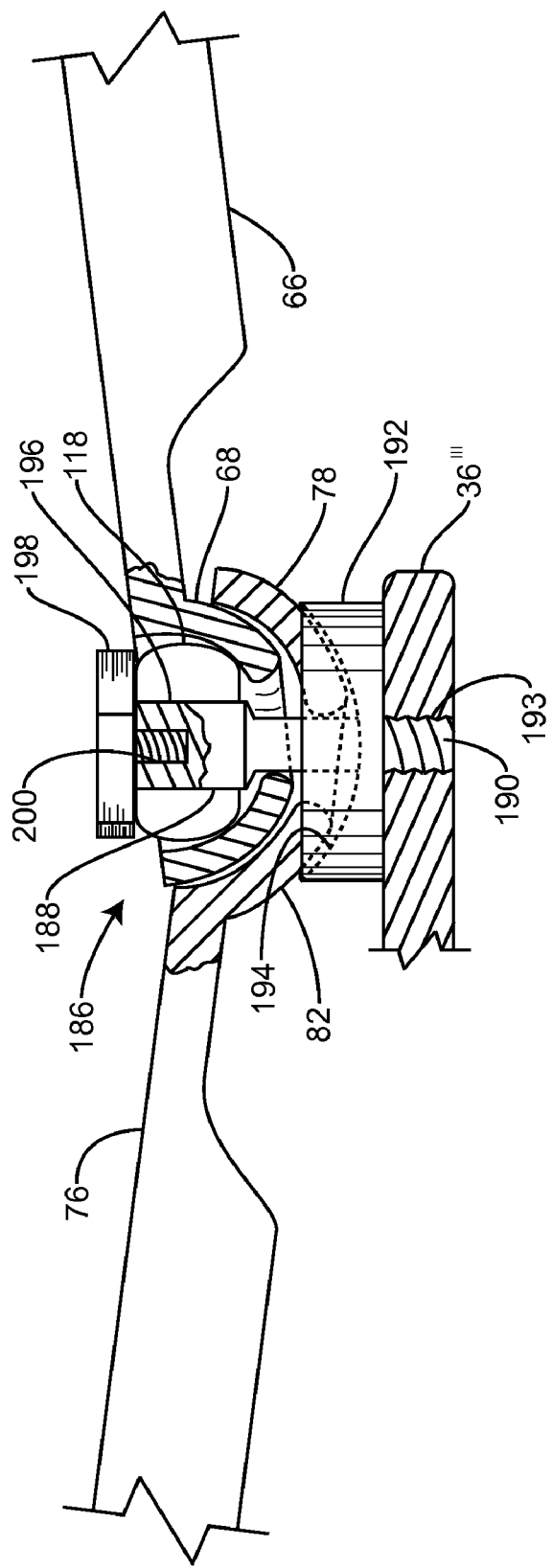
Figure 15:
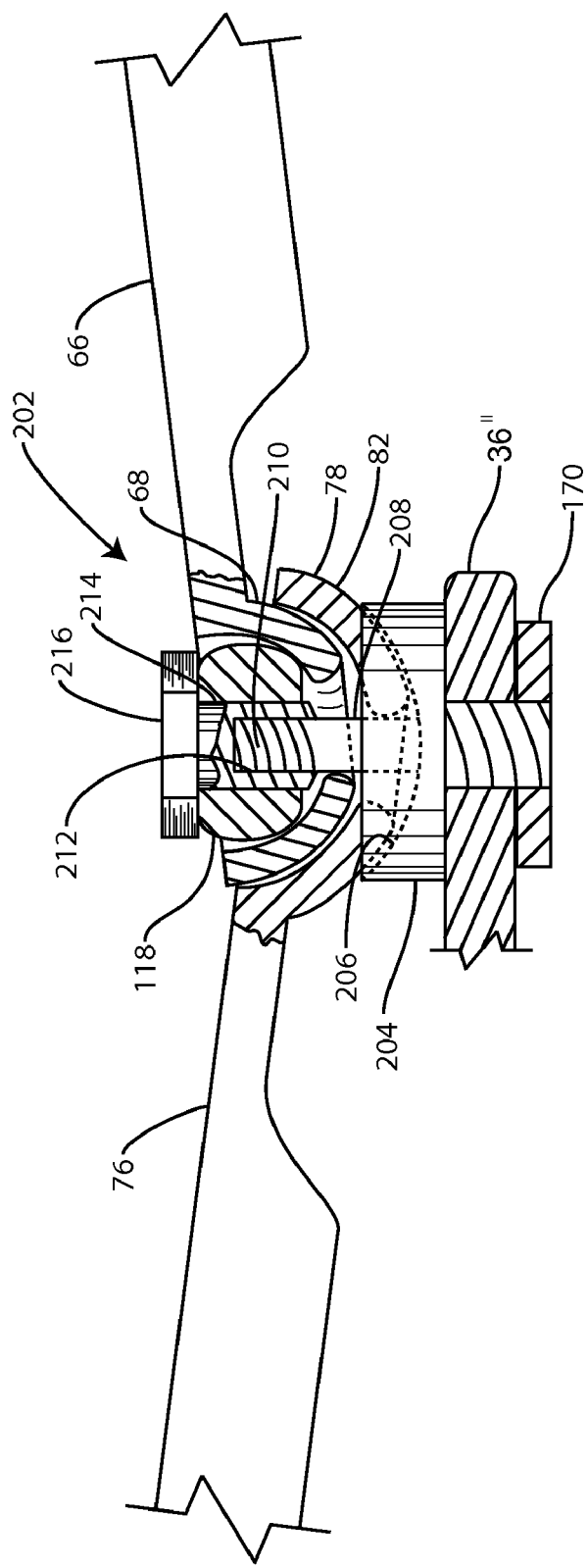

In FIGS. 13-15, simplified section views show additional alternative embodiments of the ball joint including various arrangements for attaching the ball joint to a crank arm. In FIG. 13, a ball joint 164 includes a base portion 166 fitting through a bore 168 in a crank arm 36", with a nut 170 engaged with the base portion 166 by suitable threads or other fastening means. For example, the bore 168 may also be threaded to engage the threads of the base portion 166. The base portion 166 includes a concave surface 172 facing away from the crank arm, as well as a threaded central bore 174. A shaft 176 includes a threaded portion 178 that mates with the threaded bore 174 and a head 180 that retains a ball 118 fitted on a cylindrical main body portion 182, with the couplings 68 and 78 of a pair of connecting rods mated with the ball 118 and each other and located between the ball 118 and the surface 172 of the base portion 166.

In a ball joint 186 embodying a slightly different arrangement, shown in FIG. 14, a shaft 188 has a threaded end portion 190 engaged with the crank arm 36" and also has an integral base portion 192 with threads 193 mated with threads in the crank arm 36'. A concave upper surface 194 of the base portion 192 fits matingly against the convex outer surface 82 of the coupling 78, which is nested with the coupling 68, which is mated with a spherical ball 118 fitted on a main cylindrical body portion 196. A screw 198 is fitted in a threaded bore 200 to keep the ball 118 on the main cylindrical body portion 196.

A ball joint 202, shown in FIG. 15, is a variation of the ball joint 164, shown in FIG. 13. A base portion 204 has an outwardly facing concave surface 206, and a shaft portion 208 extends from the center of the concave surface 206. A threaded portion 210 of the shaft 208 is received and held in a threaded bore 212 defined centrally within a cylindrical body 214 on which a spherical ball 118 is mounted, and a head 216 on the body 214 retains the spherical ball 118 in place. The couplings 68 and 78 are mated with the ball 118 and each other, and the outer convex surface 82 of the coupling 78 fits against the concave surface 206 of the base 204 as in the ball joints 164 and 186.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A ball-and-socket drive joint, comprising:
 (a) a shaft;
 (b) a drive ball located on said shaft;
 (c) a first coupling member including a first socket engaging said drive ball, said first coupling member having a convex outer surface extending around at least a portion of said first socket, said first coupling member defining a central opening through said first coupling member, and said shaft extending through said opening;

(d) a second coupling member including a second socket and having a central opening extending through said second socket, said convex outer surface of said first coupling member fitting matingly in said second socket and said first coupling member being angularly moveable in said second socket; and (e) a retainer interconnected with said shaft and keeping said first and second coupling members from being separated from said shaft.

2. The drive joint of claim 1 wherein said second coupling member has a convex outer surface and said retainer has a concave surface matingly disposed in contact with said convex outer surface of said second coupling member.

3. The drive joint of claim 1 wherein said shaft has a base including a mounting device.

4. The drive joint of claim 3 wherein said drive ball is located on said shaft adjacent said base.

5. The drive joint of claim 1 wherein said shaft has a base and an outer end and said drive ball is located on said shaft between said base and said outer end.

6. The drive joint of claim 5 wherein said shaft includes a cylindrical main body portion and said drive ball is located on said cylindrical main body portion.

7. The drive joint of claim 1 wherein said second coupling member has a convex outer surface extending around at least a portion of said second socket and wherein said retainer is located adjacent said second coupling member and includes a concave surface confronting said second coupling member.

8. The drive joint of claim 7 wherein said shaft has a portion that extends beyond said drive ball and that includes an external thread, and wherein said retainer has an internally threaded bore mated with said external thread.

9. A ball-and-socket articulating drive joint for a plurality of driven members, comprising:

(a) a shaft including a main body portion and an outer end portion extending beyond said body portion;

(b) a drive ball located on said main body portion of said shaft;

(c) a first connecting member including a first coupling member defining a first socket matingly engaged with and moveable about said drive ball, said first coupling member defining a first through-hole and having a convex outer surface;

(d) a second connecting member including a second coupling member defining a second through-hole and including a second socket engaged matingly with said convex outer surface of said first coupling member; and (e) a retainer fastened to said outer end portion of said shaft and located so as to keep said second socket of said second coupling member matingly engaged with said convex surface of said first coupling member.

10. The articulating joint of claim 9 wherein said second coupling member includes a convex outer surface and said outer end portion of said shaft includes an external thread and said retainer includes an internally threaded bore matingly engaged with said external thread and has a concave surface extending radially outward from said outer end portion and disposed in a mating relationship with said convex outer surface of said second coupling member.

11. The articulating joint of claim 9 wherein said second coupling member includes a convex outer surface and said retainer includes a correspondingly shaped concave surface disposed matingly adjacent said convex outer surface of said second coupling member.

12. The articulating joint of claim 11 wherein said shaft has an external thread, and wherein said retainer includes a body defining a threaded bore mated with said external thread on said shaft.

13. The articulating joint of claim 12 wherein said concave surface of said retainer is defined on a follower portion that is integral with said body thereof.

14. The articulating joint of claim 9 wherein said drive ball defines a central bore extending therethrough and receiving said main body portion of said shaft.

15. The articulating joint of claim 9 wherein said shaft is a crank pin.

16. A wiper drive assembly, comprising:

(a) a pair of wiper arm pivot shafts supported in suitable bearings for reciprocating rotation;

(b) a respective drive lever attached drivingly to each said wiper arm pivot shaft;

(c) a crank shaft mounted rotatably;

(d) a crank arm extending radially from said crank shaft;

(e) a pair of connecting rods, a respective one of said connecting rods being interconnected between said crank arm and each said drive lever so as to cause said wiper arm pivot shafts to rotate reciprocatingly through an angle in response to continuous rotation of said crank shaft; and (f) a single ball connector mounted on said crank arm and interconnecting both of said connecting rods with said crank arm, said single ball connector including:

(i) a shaft;

(ii) a drive ball located on said shaft;

(iii) a first coupling member including a first socket engaging said drive ball, said first coupling member having a convex outer surface extending around at least a portion of said first socket, said first coupling member defining a central opening through said first socket, and said shaft extending through said opening;

(iv) a second coupling member including a second socket and having a central opening extending through said second socket, said convex outer surface of said first coupling member fitting matingly in said second socket and said first coupling member being angularly moveable in said second socket; and (v) a retainer interconnected with said shaft and keeping said first and second coupling members from being separated from said shaft.

17. A drive linkage for driving a pair of driven shafts in reciprocating location by continuous rotation of a driving shaft which need not be parallel with either of said driven shafts, comprising:

(a) a respective drive lever attached drivingly to and extending radially from each of said driven shafts;

(b) a crank arm mounted on and driven by said driving shaft;

(c) a single-ball coupling mounted on said crank arm;

(d) a respective connecting rod having an outer end pivotably connected with each of said drive levers, each said respective connecting rod having an inner end connected with and driven by said single-ball coupling; and wherein said single-ball coupling comprises:

(i) a shaft;

(ii) a drive ball located on said shaft;

(iii) a first coupling member including a first socket engaging said drive ball, said first coupling member having a convex outer surface extending around at least a portion of said first socket, said first coupling member defining a central opening through said first socket, and said shaft extending through said opening;

(iv) a second coupling member including a second socket and having a central opening extending through said second socket, said convex outer surface of said first coupling member fitting matingly in said second socket and said first coupling member being angularly moveable in said second socket; and (v) a retainer interconnected with said shaft and keeping said first and second coupling members from being separated from said shaft.

\* \* \* \* \*